United States Patent [19]

Miller

[11] 4,330,396
[45] May 18, 1982

[54] CYCLIC PROCESS FOR UPGRADING A HYDROCARBON OR HYDROCARBON-FORMING FEED USING A ZSM-5 ZEOLITE

[75] Inventor: Stephen J. Miller, El Cerrito, Calif.

[73] Assignee: Chevron Research Company, San Francisco, Calif.

[21] Appl. No.: 952,420

[22] Filed: Oct. 18, 1978

[51] Int. Cl.$^3$ .............................................. C10G 35/06
[52] U.S. Cl. ..................................... 208/136; 208/138
[58] Field of Search ................................ 208/136, 138

[56] References Cited

U.S. PATENT DOCUMENTS

| | | | |
|---|---|---|---|
| 3,516,925 | 6/1970 | Lawrence et al. | 208/111 |
| 3,702,886 | 11/1972 | Argauer et al. | 423/328 |
| 3,894,939 | 7/1975 | Garwood et al. | 208/111 |

Primary Examiner—Curtis R. Davis
Attorney, Agent, or Firm—D. A. Newell; D. L. Hagmann; W. L. Stumpf

[57] ABSTRACT

In a cyclic process for upgrading a hydrocarbon or hydrocarbon-forming feed by steps including regenerating of the zeolite catalyst, the operating period or cycle is substantially increased by using a ZSM-5 zeolite having a silica-to-alumina mol ratio in the range 61 to 140.

7 Claims, 1 Drawing Figure

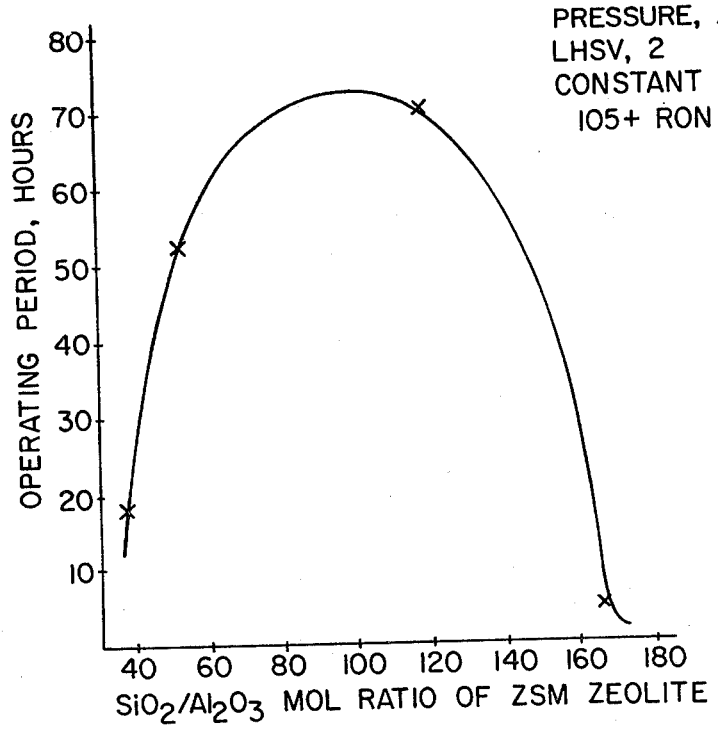

CYCLIC PROCESS FOR UPGRADING A HYDROCARBON OR HYDROCARBON-FORMING FEED USING A ZSM-5 ZEOLITE

BACKGROUND OF THE INVENTION

This invention relates to a cyclic process for catalytically upgrading a hydrocarbon or hydrocarbon-forming feed. More particularly, it relates to increasing the operating period in a cyclic process employing a ZSM-5 zeolite catalyst.

PRIOR ART

ZSM-5 crystalline aluminosilicate zeolite is known for its catalytic acitivity for use in upgrading hydrocarbon and hydrocarbon-forming feeds. This zeolite and its preparation are described in U.S. Pat. Nos. 3,702,886 (R. J. Argauer et al) and 3,770,614 (R. G. Graven), which are incorporated herein by reference, as well as in many other patent literature references. It is useful in numerous processes for upgrading hydrocarbon and hydrocarbon-forming feeds, for example in hydrocracking, isomerizing, alkylating, forming aromatic hydrocarbons, selective hydrocracking, disproportionating alkyl-substituted benzenes, dewaxing lube oil stocks, and the like hydrocarbon reactions in the presence or absence of added hydrogen gas. In its use, especially at elevated process temperatures, and like many other hydrocarbon processing catalysts, carbonaceous by-product material is deposited on and/or in its surfaces and pores. As this deposit increases, the activity and/or effectivity of the catalyst for the desired upgrading diminishes. When this activity or effectivity reaches an undesirably low level, the process is interrupted, the catalyst is regenerated by a controlled burning of the deposit, and the process is continued. The time required for the regeneration step is, of course, non-productive in terms of the desired processing, that is, the on-stream period of the process cycle. There is a need to substantially increase the on-stream or operating time in a process using a ZSM-5 zeolite catalyst.

An object of the invention is to increase the operating period in a process using a ZSM-5 catalyst.

Other objects will be evident from the examples and descriptions herein.

SUMMARY OF THE INVENTION

In accordance with the invention, in a process for upgrading a feed selected from the group consisting of hydrocarbons, hydrocarbon precursors and mixtures thereof by steps including:
(1) contacting said feed with a ZSM-5 crystalline aluminosilica zeolite having catalytic activity, the contacting being at a temperature in the range of from about 300° to 650° C. and for a period determined by continuing the contacting until the activity, resulting in the main from concurrent deposition of carbonaceous by-product upon the zeolite, reaches a predetermined reduced level;
(2) recovering the resulting hydrocarbon product; and
(3) regenerating the activity by contacting the carbonaceous zeolite resulting from step (1) with a molecular oxygen-containing gas under carbon combusting conditions;
an improvement is provided comprising at least substantially increasing said operating period by carrying out said process using a ZSM-5 zeolite having a silica-to-alumina mol ratio in the range of from about 61 to 140, preferably 90 to 105.

Surprisingly, the laydown of carbonaceous deposit, coke and/or coke-like material and the like upon the catalyst varies markedly in a process employing a ZSM-5 catalyst depending upon the silica-to-alumina mol ratio of the zeolite.

The FIGURE presents data illustrating the effect upon the operating period (on-stream time between start-up and first regeneration or between successive regenerations) as a function of the silica-to-alumina mol ratio of a ZSM-5 catalyst.

EMBODIMENT

In a preferred embodiment, a $C_3$-180° F. straight-run paraffinic and/or olefinic feed is converted in a fixed-bed reactor to an aromatic hydrocarbon mixture comprising benzene and alkyl-substituted benzenes. In the process, the feed is contacted under atmospheric pressure with the catalyst at a temperature in the range 540° to 620° C. and a liquid hourly space velocity of about 0.2 V/V/hr. At startup of the process, the temperature is adjusted to obtain an effluent process stream representing about a 50% conversion of the feed to $C_5+$ product. Thereafter, as required to maintain this conversion level (the catalyst may lose effectivity due to fouling by carbonaceous deposits), the temperature is maintained substantially constant at a temperature in the 540°–620° range or is increased from 540° C. until a predetermined cut-off temperature, for example 620° C., is reached. The feed to the reactor is then discontinued, and the reactor is purged of hydrocarbons. After a conventional burnoff of the carbonaceous deposit, for example using a dilute oxygen-containing gas and finally air, another process cycle is carried out.

The catalyst for the process is a porous composite of about equal weights of alumina and ZSM-5 zeolite in the Zn-HZSM-5 form. The ZSM-5 zeolite, for optimum operating period for the process, must have a silica-to-alumina mol ratio of about 100 (see the Figure).

The effluent product stream is separated by conventional fractional distillation into a $C_4-$ fraction and a $C_5+$ fraction. The latter has a motor octane number (ASTM D-357) of about 112. It is an excellent blending stock for use in upgrading a low-octane gasoline stock. The $C_4-$ stream may be used as fuel gas or in part recycled to the process as desired.

Temperature

The temperature herein varies widely, depending upon the hydrocarbon conversion or forming process involved, and the feed. The gist of the present invention resides in the discovery that the ZSM-5 zeolites having silica-to-alumina ratios in the 61 to 140, preferably 75 to 120, and more preferably 90 to 105, range have, in general, minimal propensity for promoting formation of coke or carbonaceous deposits; that is, they exhibit minimal fouling rates as catalysts in hydrocarbon conversion and forming reactions at temperatures where carbonaceous solids are normally a reaction by-product. Such a temperature may be as low as 300° C., for example where the feed is thermally unstable, or as high as 650° C., which is usually a maximum for hydrocarbon conversions. The present catalysts are, of course, most advantageous where the use is at temperatures in the 370° to 650° C. range, where carbonaceous by-product formation is usually a serious problem.

The Catalyst

A method for the preparation of ZSM-5 zeolites is described in the patents cited above. However, for those having rather high silica-to-alumina mol ratios, for example above 50, it is necessary that the mol ratio of the precursors of silica to alumina in the reaction mixture substantially exceed that of the desired zeolite. Depending upon the reactants, and conditions used in the preparation, this excess of silica precursor in the reaction mixture may range from a minor amount up to a one- or two-fold excess or higher. However, by standardizing the reactants and conditions and routinely carrying out several trial runs using different ratios of the precursors, the ratio of these reactants required to produce a ZSM-5 zeolite having a desired silica-to-alumina mol ratio is readily determined.

The ZSM-5 zeolite is normally prepared in its sodium form, and in this form it has little or none of the desired catalytic activity. By conventional base- and/or ion-exchange methods routinely employed in the zeolite art, the ZSM-5 zeolite is converted to its H-form, including customary drying and calcining steps. The H-ZSM-5 zeolites herein desirably having residual sodium contents below 1 weight percent, preferably less than about 100 ppm. In addition to and/or in lieu of hydrogen, the cation sites of the zeolite may also be satisfied by catalytic ions such as copper, zinc, silver, rare earths, and Group V, VI, VII and VIII metal ions normally used in hydrocarbon processing. The H-ZSM-5 and Zn-H-ZSM-5 forms of the zeolite are preferred.

The ZSM-5 catalyst may be in any convenient form, that is, as required for ordinary fixed-bed, fluid-bed or slurry use. Preferably it is used in a fixed-bed reactor and in a composite with a porous inorganic binder or matrix in such proportions that the resulting product contains from 1% to 95% by weight, and preferably from 10% to 70% by weight, of the zeolite in the final composite.

The term "porous matrix" includes inorganic compositions with which a zeolite can be combined, dispersed, or otherwise intimately admixed wherein the matrix may or may not be catalytically active. The porosity of the matrix can either be inherent in the particular material or it can be caused by mechanical or chemical means. Representative of satisfactory matrices include pumice, firebrick, diatomaceous earths, and inorganic oxides. Representative inorganic oxides include alumina, silica, amorphous silica-alumina mixtures, naturally occurring and conventionally processed clays, for example bentonite, kaolin and the like, as well as other siliceous oxide mixtures such as silia-magnesia, silica-zirconia, silica-titania and the like.

The compositing of the zeolite with an inorganic oxide matrix can be achieved by any suitable known method wherein the zeolite is intimately admixed with the oxide while the latter is in a hydrous state, for example as a hydrosol, hydrogel, wet gelatinous precipitate, or in a dried state or combinations thereof. A convenient method is to prepare a hydrous mono or plural oxide gel or cogel using an aqueous solution of a salt or mixture of salts, for example aluminum sulfate, sodium silicate and the like. To this solution is added ammonium hydroxide, carbonate, etc., in an amount sufficient to precipitate the oxides in hydrous form. After washing the precipitate to remove at least most of any water-soluble salt present in the precipitate, the zeolite in finely divided state is thoroughly admixed with the precipitate together with added water or lubricating agent sufficient in amount to facilitate shaping of the mix as by extrusion.

In addition to the matrix and ZSM-5 zeolite, the catalyst may contain a hydrogenation/dehydrogenation component which may be present in an amount varying from 0.01 to 30 weight percent of the total catalyst. A variety of hydrogenation components may be combined with either the ZSM-5 zeolite and/or the matrix in any feasible known manner affording intimate contact of the components, including base exchange, impregnation, coprecipitation, cogellation, mechanical admixture, and the like methods. The hydrogenation component can include metals, oxides and sulfides of metals of Groups VI-B, VII and VIII of the Periodic Chart of the Elements. Representative of such components include molybdenum, tungsten, manganese, rhenium, cobalt, nickel, platinum, palladium and the like and combinations thereof.

Feed

The process feed may vary widely, depending upon the hydrocarbon conversion or formation desired, for example isomerization, aromatization, selective cracking or hydrocracking, side-chain alkylation of alkyl-substituted benzenes, disproportionation of toluene, and the like. In general, the process feed herein may be petroleum distillate or polar organic hydrocarbon precursor such as alkanols, alkyl halides, and the like and mixtures thereof as well as fractions thereof. Representative feeds include $C_3$–$C_4$ paraffin mixtures, lube oil stocks, isomerizable alkylaromatic benzenes, atmospheric and vacuum gas oils, reformer effluents or reformates, light or heavy straight-run naphthas, isomerizable xylene mixtures, low-molecular-weight polar organic compounds such as methanol, ethyl chloride, and the like.

Process Conditions

The process conditions may vary widely depending upon the feed and product desired. In general, satisfactory conditions will include the following:

| | |
|---|---|
| Temperature, °C. | 300–650 |
| Pressure, Atm. gauge | 0–150 |
| Feed Rate, V/V/Hr | 0.1–20 |
| Hydrocarbon ratio, $SCM/M^3$ | 0–500 |

Examples

Using the feed and conditions listed in the Figure, a series of ZSM-5 catalysts was prepared and tested. The resulting data showing the operating period for these ZSM-5 catalysts as a function of the silica-to-alumina mol ratio are shown in the Figure. The catalyst was a porous composite of equal weights of H-ZSM-5 zeolite and amorphous alumina matrix.

The foregoing examples show that optimal operating periods are achieved when the zeolite has a silica-to-alumina mol ratio in the range of 61 to 140, especially 90 to 105.

What is claimed is:

1. In a cyclical process for upgrading a feed selected from the group consisting of hydrocarbons, hydrocarbon precursors and mixtures thereof by steps including:
   (1) contacting said feed with a ZSM-5 crystalline alumino-silica zeolite having catalytic activity, said contacting being at a temperature in the range of from about 300° to 650° C. and for a period determined by continuing said contacting until said activity, resulting in the main from concurrent deposition of carbonaceous by-product upon said zeolite, reaches a predetermined reduced level;

(2) recovering the resulting hydrocarbon product; and (3) regenerating said activity by contacting the carbonaceous zeolite resulting from step (1) with a molecular oxygen-containing gas under carbon combusting conditions;

the improvement comprising at least substantially increasing said operating period by carrying out said process using a ZSM-5 zeolite having a silica-to-alumina mol ratio in the range of from about 75 to 120.

2. A process as in claim 1 wherein said silica-to-alumina ratio range is 90 to 105.

3. A process as in claim 1 wherein said temperature is 150° to 620° C. and said zeolite contains less than 1 weight percent of sodium.

4. A process as in claim 1 wherein said zeolite is composited with a porous inorganic binder or matrix.

5. A process as in claim 1 wherein cation sites of said zeolite are satisfied by cations selected from group consisting of hydrogen, the rare earths and the metals of Groups V, VI, VII and VIII normally used in catalytic hydrocarbon processing.

6. A process as in claim 3 wherein said sodium content is less than about 100 ppm.

7. A process as in claim 1 wherein said silica-alumina ratio is about 100, said zeolite is in the Zn-H-ZSM-5 form and composited with porous alumina, and said feed is $C_3$-180° F. straight-run hydrocarbons.

* * * * *